Inventors:
Radu BANCESCU
Matyko ANDOR by

Attorney

United States Patent Office 3,501,839
Patented Mar. 24, 1970

3,501,839
VERNIER CALIPER WITH DOUBLE SCALE
Radu Bancescu, Bucharest, and Matyko Andor, Resita, Rumania, assignors to Ministerul Industriei Constructiilor de Masini, Bucharest, Rumania, a firm
Continuation of application Ser. No. 719,885, Apr. 9, 1968. This application May 19, 1969, Ser. No. 828,424
Int. Cl. G01b 5/00
U.S. Cl. 33—143          1 Claim

ABSTRACT OF THE DISCLOSURE

A vernier caliper with a double scale comprising a bar having a normal millimeter scale on one side and a double-millimeter scale on the other, the double-millimeter scale being calibrated to read half the actual measurement. The caliper has a head at one end of the scale projecting laterally to one side while an intermediate slider has a window exposing the normal millimeter scale and is of Z-shaped configuration with arms extending to opposite lateral sides, including one arm co-operating with the caliper head and on the same side as the latter and another arm extending in the opposite direction for co-operation with a second slide arm on a slide which exposes the double-millimeter scale. The sliders have locking screws opposite one another.

---

This application is a continuation of application 719,885 filed Apr. 9, 1968, now abandoned.

Our present invention relates to a slide gauge or vernier caliper capable of normal measurement and adapted to measure the distance between the centers of two cylinder bores.

Slide gauge or vernier calipers have been provided heretofore whereby measurements of the center-to-center distance of a pair of cylindrical bores can be ascertained; one such structure has three slides interconnected by a screw mechanism ensuring the displacement of the intermediate slide through a distance half that of the measuring slide, thereby permitting direct reading of half the measured value on the intermediate slide. In another slide gauge for this purpose, two slides are provided on a graduated shaft but this structure is relatively complicated and more readily subject to failure.

It is the principal object of the present invention to provide an improved slide gauge or vernier caliper of the character described.

The vernier caliper according to the present invention has a shaft graduated on one broad face with single-millimeter graduations co-operating with the central slide of the caliper for measuring the precise spacing between a laterally projecting measuring arm of the head of the caliper at the end of this bar with one arm of the central slide which has an opening or window provided with vernier graduations co-operating with the single-millimeter scale to provide true measurement of the spacing between these arms.

According to a feature of this invention, the intermediate slide is of Z-shaped configuration having two measuring noses or arms extending laterally in opposite directions from the graduated shaft or bar and located at opposite ends of this intermediate slide. The arm proximal to the head of the caliper co-operates with the arm of the latter in a path for normal measurement. The arm of the central slide remote from the head (and extending in the opposite direction from the first mentioned arm) co-operates with the single arm of a second slide whose window exposes the double-millimeter scale for center-to-center measurements. Thus the other side of the bar is provided with graduations whose divisions are located at every 2 mm. although the index readings or calibration reads at 1 cm. for every ten of such double-millimeter graduations.

Figure 1:
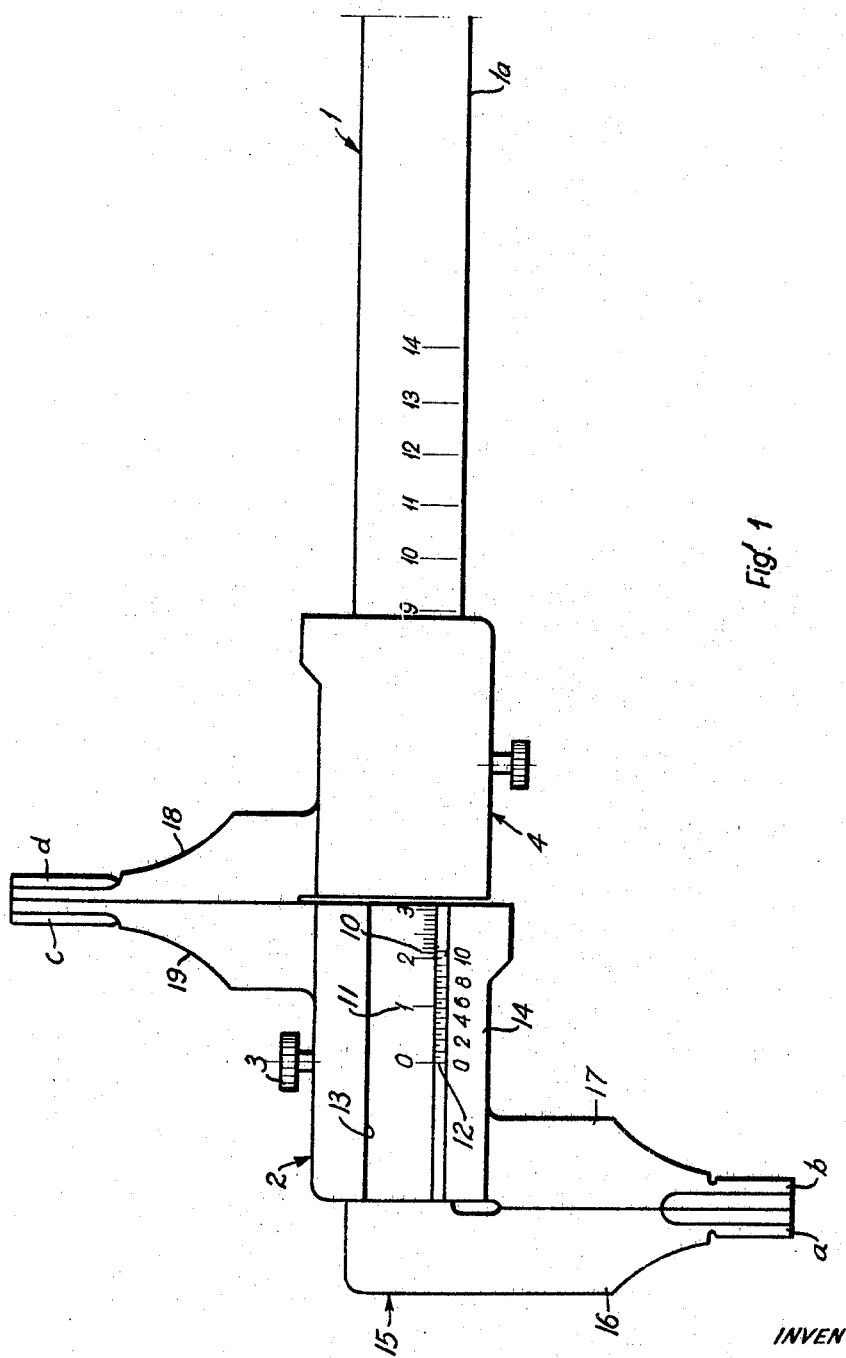
Figure 2:
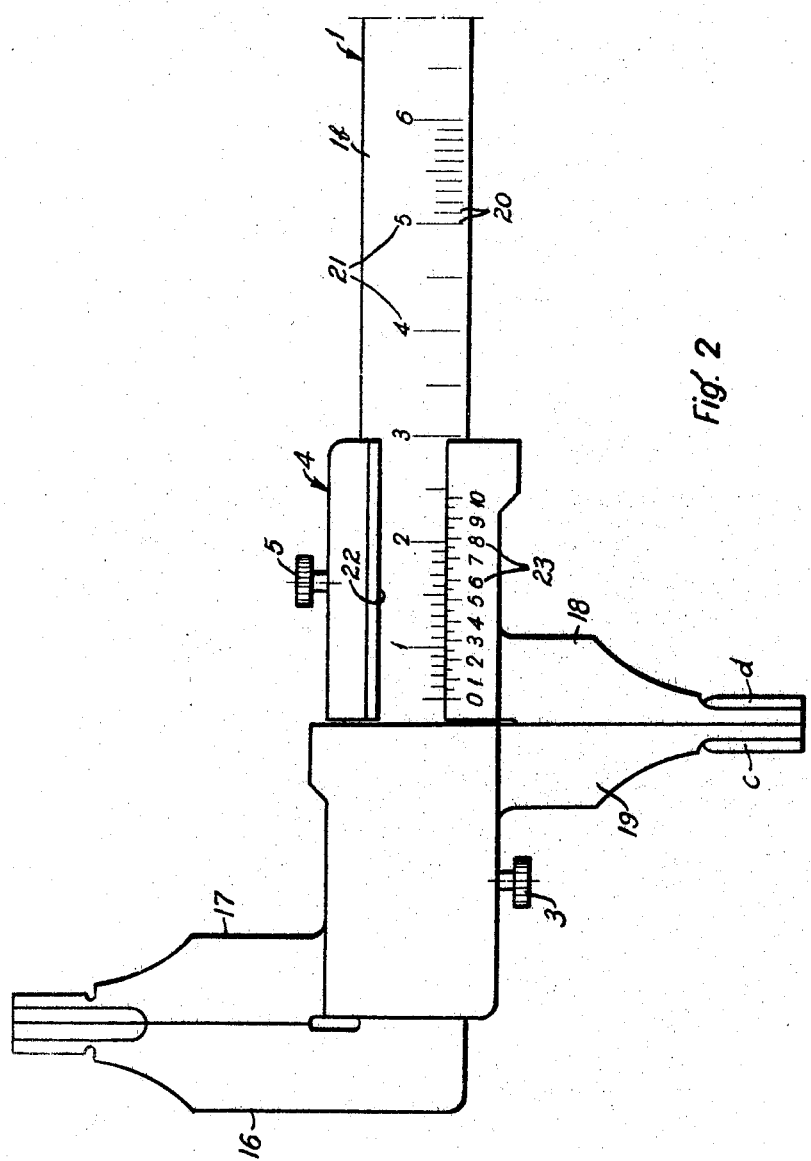
Figure 3:
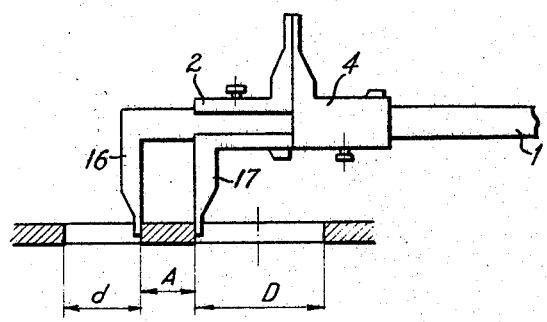
Figure 4:
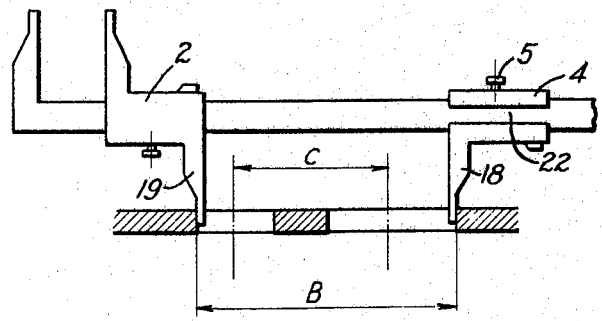

The invention is described in greater detail below with reference to the accompanying drawing in which:

FIG. 1 is a front view of a vernier caliper embodying the invention;
FIG. 2 is a rear view thereof;
FIG. 3 is a front view showing the gauge when used for measuring the width of the portion between two holes; and
FIG. 4 is a view of the caliper showing its position when the center-to-center distance is to be read.

The vernier caliper of the present invention comprises a measuring shaft or bar 1 which is calibrated on its front face 1a with divisions ten at every millimeter and indices 11 at each centimeter, the scale 10, 11 being a regular millimeter-scale co-operating with a vernier scale 12 alongside the window 13 formed in the shank 14 of a slide 2.

The head 15 at the left-hand end of the bar 1a has an arm 16 provided with a measuring nose $a$ which co-operates with the parallel arm 17 and the measuring nose $b$ of the intermediate slide 2, the arms 16 and 17 and noses $a$ and $b$ being codirectional. A locking screw 3 is provided to clamp the slide 2 to the bar 1a.

A second slide 4 is located on the opposite side of slide 1 and has an arm 18 whose measuring nose $d$ co-operates with the measuring nose $c$ of the codirectional arm 19 of intermediate slide 2. The latter has a Z-shaped configuration in which the arms 17 and 19 extend in opposite directions. As can be seen from FIG. 2, the slide 4 has a locking screw 5 by means of which the slide can be affixed to the bar 1 which, on its obverse side 1b, has a double-millimeter scale with graduations 20 at every 2 mm. and indexes 21 reading in terms of centimeters but disposed at every 10 graduations (20 mm.) apart. The window 22 in the slide 4 exposes the observe scale and is provided with vernier graduations 23 co-operating therewith.

Initially, the normal arms 16 and 17 are provided to read the width A of the web between the bores as shown in FIG. 3, the caliper being then reversed and the maximum distance of the walls of the bores is measured between the arms 18 and 19, the slide 4 being locked via screw 5. A reading can be taken through the window 22 of the center-to-center distance since the distance B measured between the arms 18 and 19 is equal to the sum $d+A+D$ and the center-to-center distance is equal to $$\frac{d+D}{2}+A$$

The distance A has previously been registered on the slide 2 and the reading through window 22 gives as the sum of the diameter $d$ and $D$.

We claim:
1. A slide gauge or vernier caliper comprising a slide bar having a pair of graduation faces; a head at one end of said bar provided with a measuring arm extending laterally of said bar in one direction, said bar having a normal millimeter scale along one of said faces and a double-millimeter scale along the other of said faces offset from said normal-millimeter scale; an intermediate slide of Z-shaped configuration having a shank formed with a window exposing said normal-millimeter scale and with a pair of arms extending in opposite directions laterally of said bar, the arms of said intermediate slide being disposed at opposite ends of said shank and including a first arm proximal to said head and codirectional with the arm thereof, and a second arm remote from said head and extending in the opposite direction, the arm of said head and the first arm of said intermediate slide having mutually facing inner measuring surfaces; a second slide formed with a window exposing said double-millimeter scale and provided with an arm codirectional with said second arm of said intermediate slide, said arm of said second slide and said second arm of said intermediate slide having mutually co-operating outer measuring surfaces facing away from one another, the measuring surfaces of said first and second arms on opposite sides of said intermediate slide facing in the same direction; locking means on said intermediate slide between the first and second arms thereof for clamping said intermediate slide to said bar and locking means on said second slide on a side thereof opposite its arm for clamping said second slide to said bar.

References Cited

FOREIGN PATENTS 509,795  1/1955  Italy.

HARRY N. HAROIAN, Primary Examiner